US009246774B2

(12) United States Patent
Mataitis et al.

(10) Patent No.: US 9,246,774 B2
(45) Date of Patent: Jan. 26, 2016

(54) SAMPLE BASED DETERMINATION OF NETWORK POLICY VIOLATIONS

(71) Applicant: Hewlett-Packard Development Company, L.P., Houston, TX (US)

(72) Inventors: Renato Mataitis, Sao Paulo (BR); Mauricio Sanchez, San Francisco, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 207 days.

(21) Appl. No.: 13/773,088

(22) Filed: Feb. 21, 2013

(65) Prior Publication Data

US 2014/0237094 A1   Aug. 21, 2014

(51) Int. Cl.
*G06F 15/173* (2006.01)
*H04L 12/24* (2006.01)
*H04L 29/06* (2006.01)

(52) U.S. Cl.
CPC ........ *H04L 41/5009* (2013.01); *H04L 63/1408* (2013.01); *H04L 63/20* (2013.01)

(58) Field of Classification Search
USPC .................. 709/223; 726/23, 25, 1; 713/154; 370/241, 242
See application file for complete search history.

(56) References Cited

U.S. PATENT DOCUMENTS

| 6,539,425 | B1 | 3/2003 | Stevens et al. |
| 7,392,301 | B1 | 6/2008 | Perry, Jr. et al. |
| 7,809,667 | B1 | 10/2010 | Yehuda et al. |
| 8,069,483 | B1 * | 11/2011 | Matlock ........................ 726/23 |
| 8,272,061 | B1 * | 9/2012 | Lotem et al. .................... 726/25 |
| 8,369,224 | B1 * | 2/2013 | Chickering et al. .......... 370/241 |
| 2011/0239268 | A1 | 9/2011 | Sharp et al. |

OTHER PUBLICATIONS

HP, "HP K.XX Switch OS Guide—Instrumentation Feature (p. 11-34)," [Online]. Available: http://bizsupport1.austin.hp.com/bc/docs/support/SupportManual/c03015497/c03015497.pdf. [Accessed Oct. 15, 2011].
snort.org, "Writing Snort IPS Rules," [Online], Available: http://manual.snort.org/node26.html. [Accessed Oct. 15, 2011].
"Simplifying Network Management with Enterasys: Reducing the complexity and cost of network management with OneFabric™," enterasys Secure Networks, 2011, pp. 1-9, Enterasys Networks, Inc., Available at: <onefabric.net/literature/OneFabricWhitepaper.pdf>.
Dilip A. Joseph et al., "A Policy-aware Switching Layer for Data Centers," SIGCOMM'08, Aug. 17-22, 2008, Seattle, Washington, USA, ACM, pp. 51-62, Available at: <radlab.cs.berkeley.edu/w/upload/d/da/PLayerSigcomm08.pdf>.
Renata Cruz Teixeira, "Network Troubleshooting from End-Hosts," HDR Dissertation, Universite Pierre et Marie Currie, May 2010, pp. 1-46, Available at: <rp.lip6.fr/~teixeira/teixeira-manuscript.pdf>.

* cited by examiner

*Primary Examiner* — Kyung H Shin
(74) *Attorney, Agent, or Firm* — Hewlett Packard Enterprise Patent Department

(57) ABSTRACT

Disclosed herein are a system, computer-readable medium, and method for enforcing network policies. Samples of data traveling through at least some nodes of a network are collected. It is determined whether a node violated a predefined network policy based on the samples.

14 Claims, 4 Drawing Sheets

SAMPLE BASED DETERMINATION OF NETWORK POLICY VIOLATIONS

BACKGROUND

Server virtualization has lead to the creation of large and dynamic data centers that provide great benefits for users and entities employing the services thereof. Such data centers may comprise a large number of interconnected network nodes. These nodes may contain one or more of a variety of network devices for relaying, combining, directing and otherwise handling information in its transit across the network. These devices may include edge switches, repeaters, routers, bridges, switches and hubs.

DETAILED DESCRIPTION

As noted above, server virtualization has lead to the creation of large and dynamic data centers. However, the density and mobility of such data centers also create a new level of configuration and troubleshooting complexity. As greater numbers of virtualized servers consume the same physical resources, maintenance and proper configuration of these servers have become tedious and highly error prone. Furthermore, server virtualization allows workloads to be distributed dynamically, which exacerbates the configuration and troubleshooting problem. A trivial configuration error may cause a network to experience a significant decline in performance. Unfortunately, such configuration errors may take several weeks to diagnose.

In view of the foregoing, disclosed herein are a system, computer-readable medium, and method for enforcing network policies. In one example, samples of data traveling through at least some nodes of a network are collected. In a further example, it is determined whether a node violated a predefined network policy based on the samples. The system, computer-readable medium, and method disclosed in the present disclosure can reduce network troubleshooting from weeks to minutes. In this regard, the techniques herein can improve the profitability and customer goodwill of data centers managing these networks. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
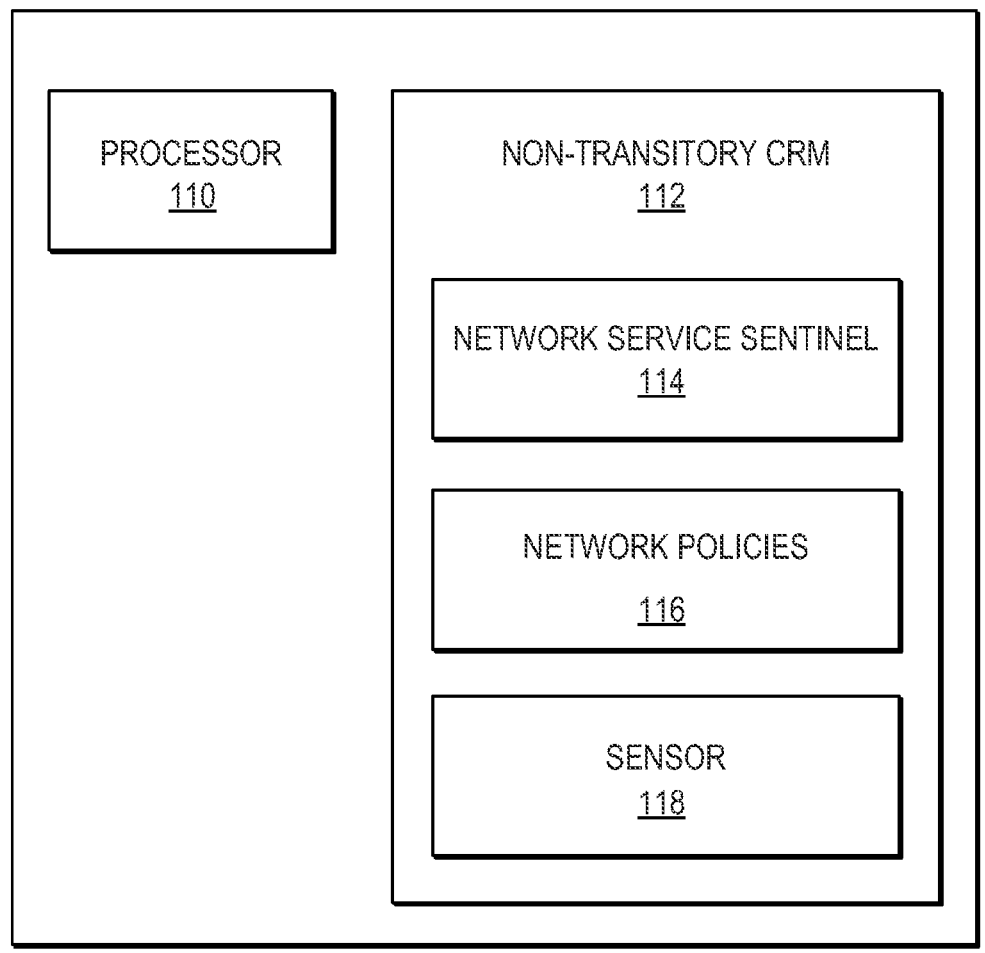
FIG. 1 is a block diagram of an example system in accordance with aspects of the present disclosure.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network.

The computer apparatus 100 may also contain a processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. As will be discussed in more detail below, the instructions may include a network service sentinel 114 and a sensor 118. Furthermore, computer apparatus 100 may contain data that may be retrieved by processor 110, such as network policies 116. In one example, non-transitory CRM 112 may be used by or in connection with any instruction execution system that can fetch or obtain the logic from non-transitory CRM 112 and execute the instructions contained therein.

Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

In one example, a network comprising a plurality of interconnected nodes may have a plurality of sensors, such as sensor 118, to collect samples of data traveling through at least some nodes in the network. Network service sentinel 114 may determine whether a node violates a predefined network policy based on the samples and, if the node violates the predefined network policy, network service sentinel 114 may generate an alert containing an identification of the node and the predefined network policy being violated by the node.

Figure 2:
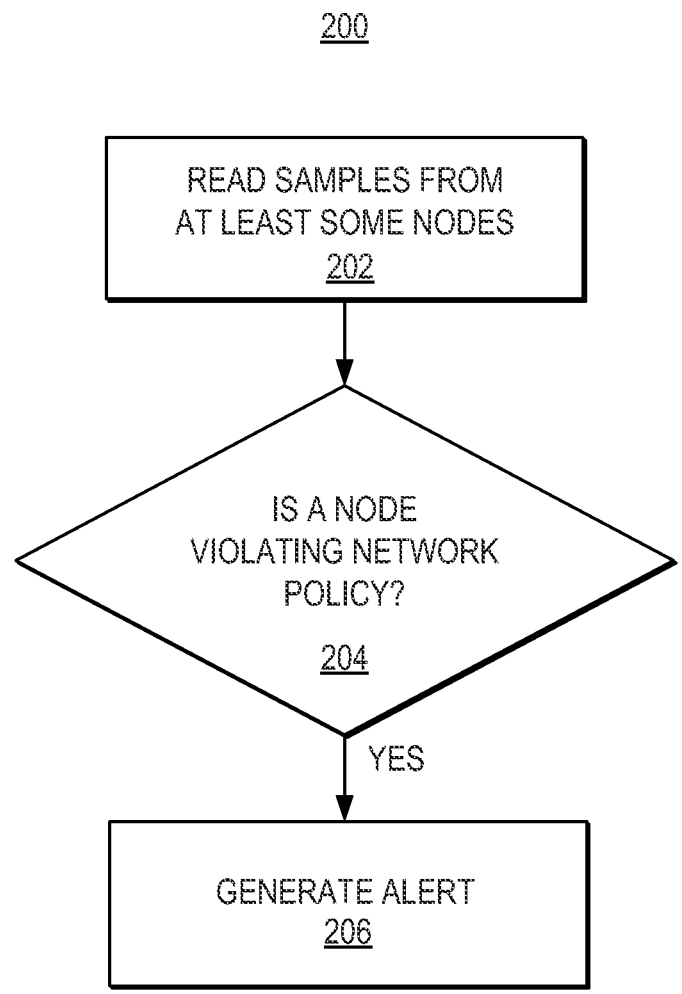
FIG. 2 is a flow diagram of an example method in accordance with aspects of the present disclosure.
Figure 3:
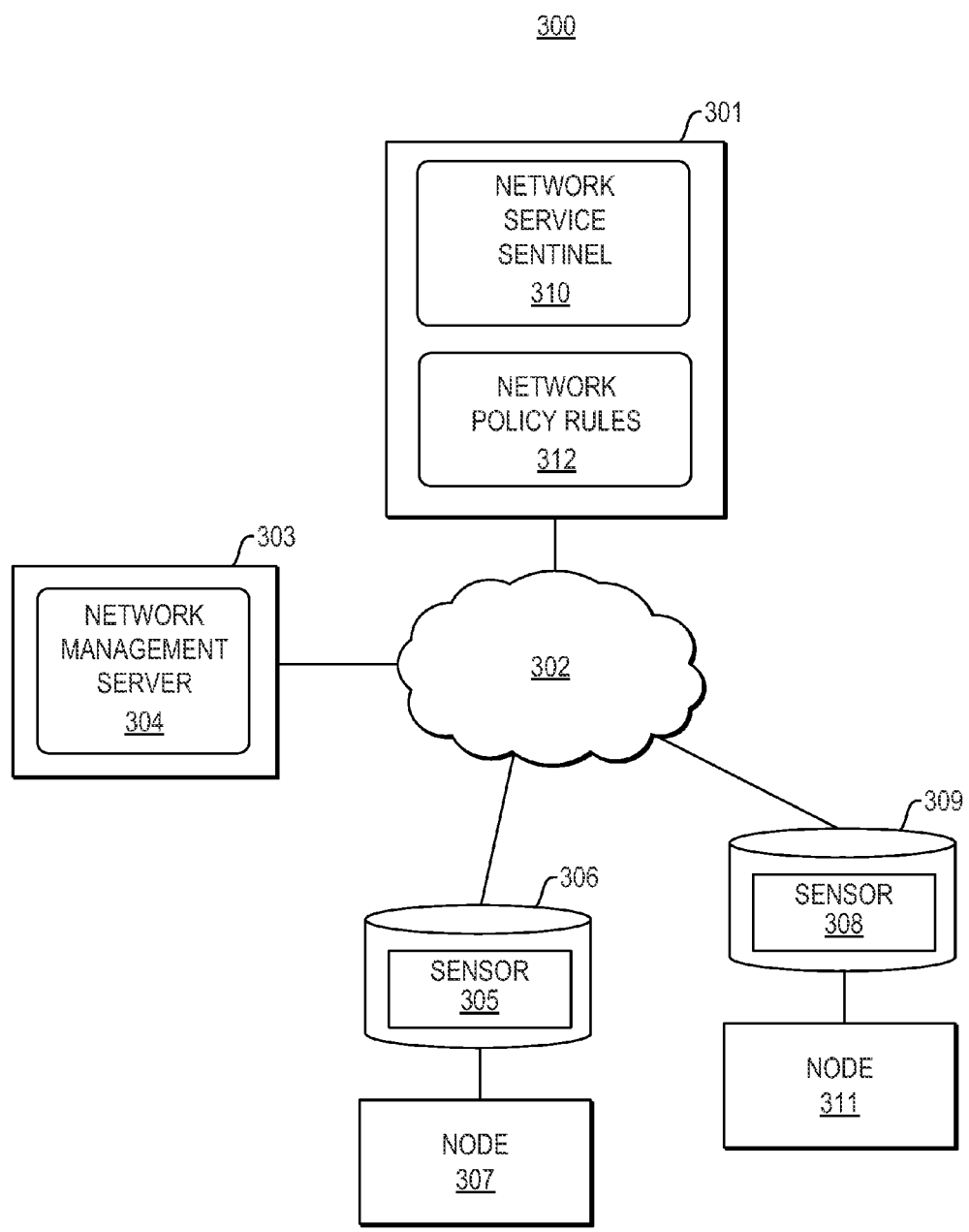
FIG. 3 is a working example in accordance with aspects of the present disclosure.
Figure 4:
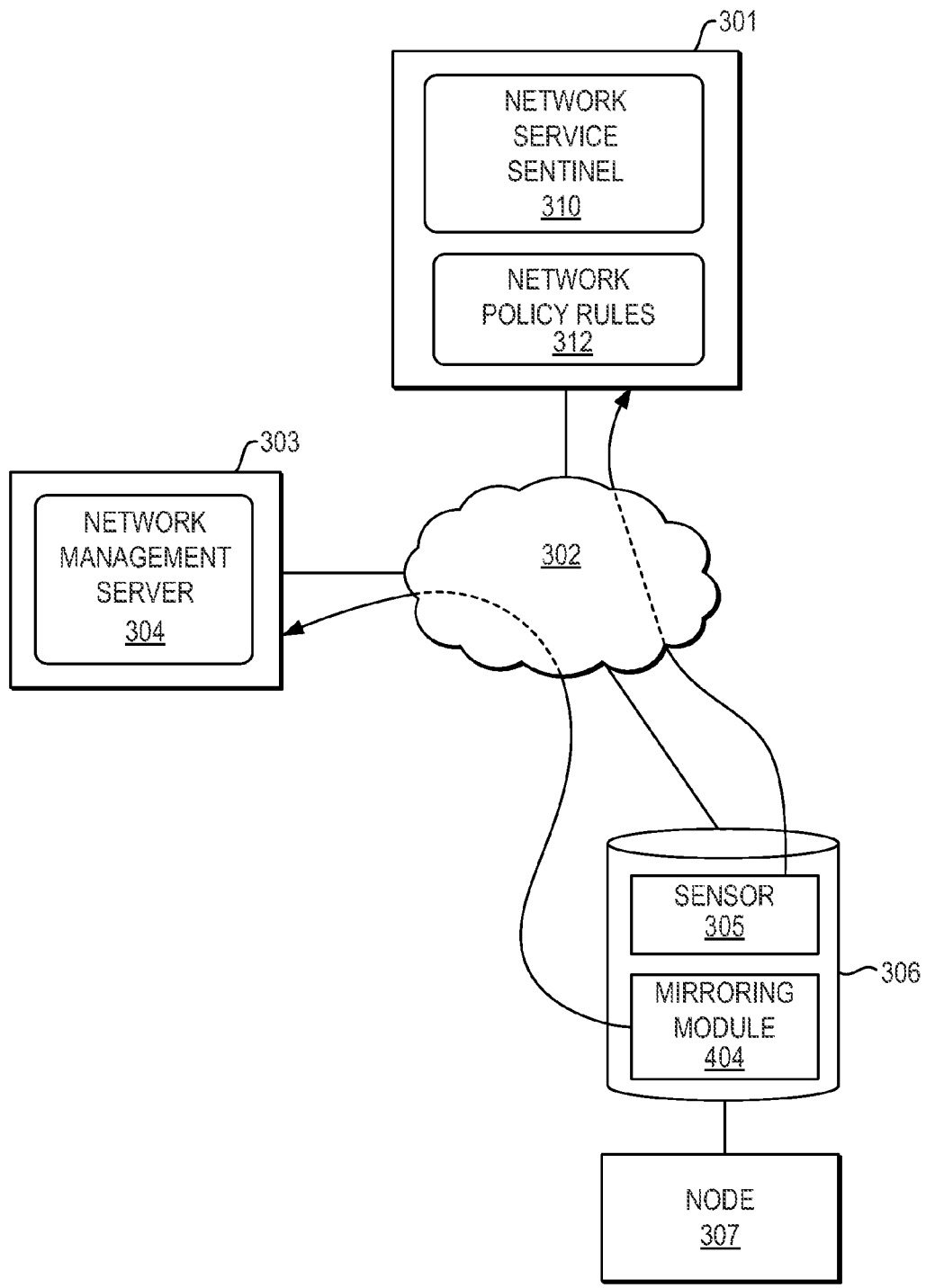
FIG. 4 is a further working example in accordance with aspects of the present disclosure.

Working examples of the system, method, and non-transitory computer-readable medium are shown in FIGS. 2-4. In particular, FIG. 2 illustrates a flow diagram of an example method 200 for enforcing network policies. FIGS. 3-4 each show a working example in accordance with the techniques disclosed herein. The actions shown in FIGS. 3-4 will be discussed below with regard to the flow diagram of FIG. 2.

As shown in block 202 of FIG. 2, samples from at least some nodes in a network may be read. Referring now to FIG. 3, a schematic diagram depicts various computing nodes 301, 303, 307 and 311 in a networked configuration. Such nodes may be interconnected via a network 302, which may be a LAN, WAN, the Internet, etc., which may be wired or wireless. Such networks and intervening nodes thereof may use various protocols including virtual private networks, local Ethernet networks, private networks using communication protocols proprietary to one or more companies, cellular and wireless networks, HTTP and SMTP, and various combinations of the foregoing. Although only a few nodes are depicted in FIG. 3, it should be appreciated that a typical system can include a large number of connected nodes and that FIG. 3 is merely illustrative.

Communication across network 302, including any intervening nodes, may be facilitated by any device capable of transmitting data to and from other computers. In the example of FIG. 3, edge switches 306 and 309 may be used to facilitate network traffic in and out of nodes 307 and 311. Although certain advantages may be obtained when information is transmitted or received with edge switches, the techniques disclosed herein are not limited to any particular manner of transmission of information. For example, in some aspects, the information may be sent via routers, routing switches, integrated access devices, multiplexers, or the like. Furthermore, any one of the nodes 301, 303, 307, and 311 may comprise a plurality of computers, such as a load balancing network, that exchange information with different nodes of a network for the purpose of receiving, processing and transmitting data. In this instance, the devices will typically still be at different nodes of the network than any of the computers comprising each node.

Sensors 305 and 308 may execute in edge switches 306 and 309 respectively to collect samples of network traffic entering and exiting nodes 307 and 311. In one example, sFlow® technology may be utilized to collect the network traffic samples and return those samples to network service sentinel 310 executing in node 301.

Referring back to FIG. 2, it may be determined whether a node in the network is violating a network policy, as shown in block 204. Referring back again to FIG. 3, sensors 305 and 308 may return samples of network traffic back to network service sentinel 310. In turn, network service sentinel 310 may evaluate the samples against network policy rules 312. In one example, the policy rules may be encoded with a policy language derived from the open-source SNORT® intrusion prevention service ("IPS") signature language. IPS signature language may comprise an ordered set of rules containing regular expressions and Boolean logic against which the samples from sensors 305 and 308 may be evaluated against. Some network policies may include, but are not limited to, limitations on CRC errors or thresholds for unknown unicast and multicast MAC address induced switch flooding.

Referring back to FIG. 2, if it is determined that a network policy has been violated, an alert may be generated, as shown in block 206. Once again referring to FIG. 3, if network service sentinel 310 detects a policy violation, it may send an alert to network management server 304. In turn, network management server 304 may display the alert to an administrator.

Referring now to FIG. 4, a further example of enforcing network policies in accordance with the techniques presented herein is shown. This example shows network traffic samples being transmitted from sensor 305 to network service sentinel 310. In yet a further example, if it is determined that node 307 violates a network policy, a mirroring module 404 may be activated in edge switch 306. Mirroring module 404 may replicate real time data traveling through node 307 to network management server 304. Network management server 304 may display copies of these data packets on a monitor. This allows an administrator to view the real-time traffic and locate the network policy violations as they occur. In one example, the mirroring may be accomplished by re-encapsulating the traffic in a layer 3 tunnel and forwarding it to a specified IP address in the network.

Advantageously, the foregoing system, method, and non-transitory computer readable medium allow network policy violations to be detected automatically without tedious analyzes by network engineers that could take weeks to complete. Once the violations are automatically detected, the real time traffic may be forwarded to an administrator that allows the administrator to view the violation as it occurs. In this regard, data centers managing these networks can better meet the needs of their clients.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising,
a network comprising a plurality of interconnected nodes;
a plurality of sensors which, if executed, instruct at least one processor to collect samples of data traveling through at least some nodes in the network;
a network service sentinel comprising at least one hardware processor to:
determine whether a node violates a predefined network policy based on the samples; and
if the node violates the predefined network policy, generate an alert containing an identification of the node and the predefined network policy being violated by the node; and
a mirroring module which, if executed, instructs at least one processor to replicate real time data traveling through the node to the network management server, in response to a determination that the node violates the predefined network policy.

2. The system of claim 1, further comprising a network management server which, if executed, instructs at least one processor to display the alert generated by the network service sentinel.

3. The system of claim 1, wherein the predefined network policy comprises regular expressions and Boolean logic.

4. The system of claim 1, wherein at least some of the plurality of nodes connects to the network using an edge switch.

5. The system of claim 3, wherein at least one of the plurality of sensors executes in the edge switch.

6. A non-transitory computer readable medium, comprising instructions therein which, if executed, instruct at least one processor to:
read samples collected by a plurality of sensors distributed across a network of interconnected nodes, the samples comprising network data packets traveling through at least some nodes in the network;

determine whether a node violates a predefined network policy based on the collected samples; and if the node violates the predefined network policy, identify the node violating the predefined network policy, replicate real time data packets traveling through the node to a network management server, and generate an alert to indicate the predefined network policy violated by the node.

7. The non-transitory computer readable medium of claim 6, wherein the instructions therein, if executed, further instruct at least one processor to forward the alert to a network management server.

8. The non-transitory computer readable medium of claim 6, wherein the predefined network policy comprises regular expressions and Boolean logic.

9. The non-transitory computer readable medium of claim 6, wherein at least some of the plurality of nodes connects to the network using an edge switch.

10. The non-transitory computer readable medium of claim 9, wherein at least one of the plurality of sensors executes in the edge switch.

11. A method comprising:

reading, using at least one processor, samples of network data packets traveling through at least some nodes of a network;

determining, using at least one processor, whether a node violates a predefined network policy based on the samples;

if the node violates the predefined network policy, displaying, using at least one processor, an alert identifying the node and indicating the predefined network policy violated by the node; and displaying, using at least one processor, copies of the real time data packets traveling through the node, in response to a determination that the node violates the predefined network policy.

12. The method of claim 11, wherein the predefined network policy comprises regular expressions and Boolean logic.

13. The method of claim 11, wherein at least some of the nodes connects to the network using an edge switch.

14. The method of claim 13, wherein the edge switch comprises a sensor to collect the samples of network data.

* * * * *